United States Patent Office 3,549,754
Patented Dec. 22, 1970

3,549,754
COMBINATION OF 2-SUBSTITUTED BENZIMIDA-
ZOLES AND SUBSTITUTED PHENOTHIAZINES
IN THE TREATMENT OF HELMINTHIASIS
Joseph Di Netta, Watchung, and John R. Egerton, Neshanic Station, N.J., assignors to Merck & Co., Inc., Rahway, N.J., a corporation of New Jersey
No Drawing. Continuation-in-part of abandoned application Ser. No. 626,634, Mar. 28, 1967, which is a continuation of abandoned application Ser. No. 439,927, Mar. 15, 1965. This application Apr. 21, 1969, Ser. No. 818,129
Int. Cl. A61k 27/00
U.S. Cl. 424—247
20 Claims

ABSTRACT OF THE DISCLOSURE

The anthelmintic activity of 2-substituted benzimidazoles and substituted phenothiazines is greatly enhanced when either of them is administered to domestic animals in the presence of other. Administration of the benzimidazoles and the phenothiazines simultaneously in a single composition, or sequentially within such period of time as will allow a beneficial interaction affords a higher anthelmintic response then is achieved by administration by either component alone.

---

This application is a continuation-in-part of prior copending application Ser. No. 626,634, filed Mar. 28, 1967, now abandoned, which in turn is a continuation of application Ser. No. 439,927, now abandoned.

This invention relates to compositions and methods useful in the treatment of parasitic diseases in animals. More particularly, the invention relates to compositions containing anthelmintically active tricyclic compounds, compositions containing both anthelmintically active 2-substituted benzimidazoles and tricyclic compounds which enhance the anthelmintic action of the 2-substituted benzimidazoles, and methods for using the tricyclic compounds either alone or together with the 2-substituted benzimidazoles. Specifically, it relates to the methods and compositions above mentioned wherein the tricyclic compounds are substituted phenothiazines.

Helminthiasis is a widely occurring disease affecting animals, including humans, and causes large economic losses in the domesticated animal industry. Particularly susceptible to the disease are ruminants such as sheep, cattle, and goats, and equines such as horses and mules. A wide variety of anthelmintic agents have been discovered and have varying degrees of efficacy on the particular helminths causing the infections. Among such classes of materials is a family of 2-substituted benzimidazoles. In view of the large economic interest in the prevention and control of helminthiasis, modern-day research is directed toward providing new classes of anthelmintically active materials and finding ways for improving the efficacy of the currently known anthelmintic agents.

It is accordingly an object of the present invention to provide compositions possessing a high degee of anthelmintic activity. Another object is to provide compositions containing anthelmintically active substituted phenothiazines. Another object is to provide compositions which contain effective anthelmintic and antifungal 2-substituted benzimidazoles and substituted phenothiazines in which the latter compounds enhance the potency and efficacy of the 2-substituted benzimidazole. Yet a further object is to provide methods for treating helminthiasis with substituted phenothiazines with the substantial absence of significant toxic effects. Still another object is to provide a method for treating helminthiasis with substituted phenothiazines together with anthelmintically active 2-substituted benzimidazoles wherein the substituted phenothiazines enhance the activity of the benzimidazoles. These and other objects will appear from the detailed description which follows.

According to the present invention, it has been surprisingly discovered that the anthelmintic activity of 2-substituted benzimidazoles can be greatly enhanced when the benzimidazole is administered to the host animal in the presence of a substituted phenothiazine. Thus, in one of its preferred aspects, the invention provides novel 2-component compositions wherein one component is at least one compound of a class of substituted phenothiazines and the other component is at least one anthelmintically active 2-substituted benzimidazole. The 2-substituted benzimidazoles contemplated for use in the present invention have the following structural formula:

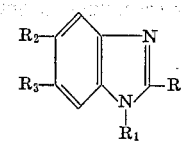

where R is thiazolyl, isothiazolyl, thiadiazolyl, pyrryl, furyl, halofuryl, thienyl, naphthyl, halonaphthyl such as 2-naphthyl-3-fluoro, pyridyl, pyrazinyl, coumarinyl, thiacoumarinyl, phenyl, or halophenyl, $R_1$ is hydrogen, hydroxy, alkoxy, lower alkyl, alkenyl, or acyl such as alkanoyl and aroyl, exemplified by acetyl, propionyl, butyryl, benzoyl, and the like, $R_2$ and $R_3$ are hydrogen, lower alkyl, lower alkoxy, halogen, phenyl, halophenyl, phenoxy, thienyl, or trifluoromethyl. Also contemplated for use are the non-toxic acid addition salts of the foregoing compounds. Typical of the 2-substituted benzimidazoles which may be employed are 2-(4'-thiazolyl)benzimidazole,
2-(2'-thiazolyl)-benzimidazole,
2-(4'-thiazolyl)-5-methyl benzimidazole,
2-(2'-thiazolyl)-5,6-dimethyl benzimidazole,
2-(4'-thiazolyl)-5-trifluoromethyl benzimidazole,
2-(3'-thienyl)benzimidazole,
2-phenyl benzimidazole,
2-(2'-chlorophenyl)benzimidazole,
1-methyl-2-phenyl benzimidazole,
2-phenyl-5,6-dimethyl benzimidazole,
2-phenyl-5-ethoxy benzimidazole,
2-(2'-thienyl)benzimidazole,
1-methyl-2(2'-thienyl)-benzimidazole,
1,5-dimethyl-2-(2'-thienyl)benzimidazole,
2-(2'-thienyl)-5,6-dimethyl benzimidazole,
2-(2'-thienyl)-5-methyl benzimidazole,
1-ethyl-2-(3'-thienyl)benzimidazole,
1-allyl-2-(3'-thienyl)benzimidazole,
2-(3'-thienyl)-5,6-dimethoxy benzimidazole,
2-(2'-furyl)benzimidazole,
2-(3'-furyl)benzimidazole,
1-methallyl-2-(3'-furyl)benzimidazole,
1-butyl-2-(2'-furyl)benzimidazole,
2-(2'-pyrryl)benzimidazole,
2-(3'-pyrryl)benzimidazole,
1-ethyl-2-(2'-pyrryl)benzimidazole,
1-allyl-2-(3'-pyrryl)benzimidazole,
2-(2'-pyrryl)-5-ethoxy benzimidazole,
2-(2'-pyridyl)benzimidazole,
2-(3'-pyridyl)benzimidazole,
2-(3'-coumarinyl)benzimidazole,
2-(3'-thiacoumarinyl)-benzimidazole,
and 2-(2'-naphthyl)benzimidazole.

Preferred among the foregoing for use in the present invention are 2-(4′-thiazolyl)benzimidazole,
2-(2′-thiazolyl)-benzimidazole,
2-phenyl benzimidazole,
2-(3′-thienyl)-benzimidazole,
2-(2′-thienyl)benzimidazole,
2-(2′-furyl)-benzimidazole, and 2-(2′-pyrryl)benzimidazole, and most preferred is 2-(4′-thiazolyl)benzimidazole. Also, nontoxic acid addition salts of the foregoing compounds may be employed. Nontoxic is used in this specification in the sense that said salts do not produce intolerable side effects when administered at effective dosage levels. Such acid addition salts as are obtained from the hydrohalic acids, sulfuric acid, nitric acid, phosphoric acid, citric acid, acetic acid, propionic acid, oxalic acid, succinic acid, and the like may be used.

The substituted phenothiazines that may be employed in the present invention are selected from the class of compounds having the structural formula

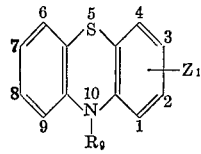

and nontoxic salts thereof, wherein $Z_1$ is hydrogen, halogen, or acyl such as alkanoyl and exemplified by acetyl, propionyl, and the like, and $R_9$ is hydrogen, a substituted propyl radical of the formula $$-CH_2CHR_{10}CH_2R_{11}$$

or a piperidyl radical of the formula

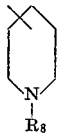

wherein $R_{10}$ and $R_{11}$ are hydrogen or the radical

wherein $R_6$ and $R_7$ are hydrogen, alkyl, or radicals in which the nitrogen atom forms part of a heterocyclic radical with $R_6$ and $R_7$, and $R_8$ is alkyl or hydroxyalkyl, provided that $Z_1$ and $R_9$ are not at the same time hydrogen. Typical of the heterocyclic radicals that the group

may form are piperidino, pyrrolidino, piperazino, morpholino, substituted or unsubstituted, and the like. Similarly, the salts may be acid addition salts derived from hydrohalic acids such as hydrochloric acid and hydrobromic acid, sulfuric acid, nitric acid, phosphoric acid, citric acid, acetic acid, propionic acid, oxalic acid, succinic acid, tartaric acid, and the like. Also contemplated for use are quaternary ammonium salts such as those obtained from dialkyl sulfates, alkyl halides, and the like.

Representative of the substituted phenothiazines which may be employed are 2-chloro-10-(3-dimethylaminopropyl)-phenothiazine, also known as chlorpromazine, 2-chlorophenothiazine, 2-chloro-10-[3-(1-(2-hydroxyethyl)-4-piperazinyl)-propyl]-phenothiazine, also known as perphenazine, and 10-(2-diethylamino-1-propyl)-phenothiazine. Preferred among the foregoing are 2-chloro-10- (3-dimethylaminopropyl)-phenothiazine, and 10-(2-diethylamino-1-propyl)-phenothiazine.

With regard to the individual amounts of the 2-substituted benzimidazole and the substituted phenothiazine present in the composition, such amounts should be sufficient to provide an effective dosage for the proper treatment of the parasitic disease considering, of course, the ability of the substituted phenothiazine to enhance the anthelmintic activity of the 2-substituted benzimidazole. These amounts will vary depending on the mode of treatment. The activity of the components, the size of the host, and the severity of infection. The compositions are highly effective against a phenothiazine resistant strain of *Haemonchus contortus* and the Strongyle species commonly found in sheep and cattle and ordinarily result in an overall efficacy of from about 1.5–3.5 times the efficacy that would be expected from the sum of the individual activities of each component if each were used alone. In this regard, the substituted phenothiazine need not be present at such dosage levels as to be anthelmintically active itself, it having been discovered that the compounds will exercise their enhancing effect even when employed at levels which, if used alone, would not be anthelmintically active in the host. Generally, when single unit dosage forms such as tablets, boluses, or drenches are desired to be administered to the animal, suitable results are obtained when the compositions contain enough of the benzimidazole, in the presence of the substituted pehnothiazine to provide a dosage level of the benzimidazole of from 0.1–450 mg./kg. of animal body weight.

The amount of substituted phenothiazine used in the compositions in conjunction with the foregoing dosage levels of the benzimidazoles in order to obtain the enhancing action is generally an amount sufficient to provide from about 0.05 to 3.0 times the benzimidazole dosage level. On a weight ratio basis, therefore, this range corresponds to a benzimidazole substituted phenothiazine ratio in the composition of from 1:0.05–1:3. Preferably, the ratio ranges from 1:0.06–1:0.8. Stated another way, the substituted phenothiazine compounds are present in the compositions to the extent of from 5–300% and preferably 6–80% based on the weight of 2-substituted benzimidazole present in the composition.

The combined amounts of each compound in the composition, as well as the remaining constituents of the composition, will vary according to the type of treatment to be employed, the host animal, and the particular parasitic disease being treated. In general, however, compositions containing a total weight percent of the benzimidazole and substituted phenothiazine ranging from 0.001 to 95% will be suitable, with the remainder being any suitable carrier or vehicle. Within this range, the relative amounts of benzimidazole compound to substituted phenothiazine is not critical except to the extent that the resulting composition is pharmaceutically effective, considering the ability of the latter compound to enhance the activity of the benzimidazole. When the compositions are to be solid unit dosage forms as in tablets or boluses, the ingredients other than the benzimidazoles and substituted phenothiazines may be any other acceptable vehicles convenient in the preparation of such forms, and preferably materials nutritionally suitable such as starch, lactose, talc, magnesium stearate, vegetable gums, and the like. In such forms, the combined amounts of anthelmintic ingredients conveniently ranges from about 5 to 80% by weight of the total composition.

When the unit dosage form is to be in the form of a drench, the benzimidazoles and substituted phenothiazines may be mixed with agents which will aid in the subsequent suspending of the anthelmintic ingredients in water, such as bentonite, clays, water soluble starches, cellulose derivatives, gums, surface active agents, and the like to form a dry predrench composition, and this predrench composition added to water just before use. In the predrench formulation, in addition to the suspending agent, such ingredients as preservatives, antifoaming compounds, and the like may be employed. Such a dry product may contain over 95% by weight of the anthelmintic compounds, the rest being contributed by the excipients. Preferably, the solid composition contains from 30% to 95% by weight of the combined weights of the benzimidazole and substituted phenothiazines. Enough water should be added to the solid product to provide the proper dosage level within a convenient amount of liquid for a single oral dose. A commonly used measure in the field is one fluid ounce of material and thus that one fluid ounce of material should contain enough of the compounds to provide the effective dosage level. Liquid drench formulations containing from about 10 to 80 weight percent of dry ingredients will in general be suitable with the preferred range being from 15 to 50 weight percent.

Where the compositions are intended to be used as feeds, feed supplements, or feed premixes, they will be mixed with suitable ingredients of an animal's nutrient ration. The solid orally ingestible carriers normally used for such purposes, such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone, and the like are all suitable. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Feed supplement formulations containing from about 5% to about 50% by weight, and preferably from about 10–30% by weight of active ingredient are particularly suitable for addition to feeds. The active compounds are normally dispersed or mixed uniformly in the diluent but in some instances may be adsorbed on the carrier.

These supplements are added to the finished animal feed in an amount adequate to give the final concentration desired for controlling or treating helminthiasis by way of the animal ration. Although the preferred level in feeds will depend on the particular compounds being employed, the combined weights of benzimidazole and substituted phenothiazine of this invention are normally fed at levels of 0.05–25% in the feed. Where the treatment is prophylactic, smaller amounts may be employed, suitably of the order of 0.001–3.0 weight percent based on the weight of feed, and may be administered over prolonged periods. An advantageous method of administering the compositions of this invention to animals whose feeds are conveniently pelleted, such as sheep, is to incorporate them directly in the pellets. For instance, the compositions of the present invention are readily incorporated in nutritionally adequate alfalfa pellets (during the pelleting operation) at levels of about 2 to 110 grams per pound of pellets for therapeutic use, and at lower levels for prophylactic use, and such pellets fed to the worm-infected animals. Alternatively, the anthelmintic compositions may be incorporated in salt licks or salt blocks at any desired concentration (concentrations of 5–25% by weight are conveniently employed). Large animals, such as sheep and cattle, then receive the anthelmintics with their salt.

As stated previously, a preferred mode of administering the substituted phenothiazine with the 2-substituted benzimidazole is to formulate them together into a single composition. It is, however, an added feature of the invention that the two compounds need not be administered simultaneously in one formulation. They may be administered separately, each in its own formulation if desired, to obtain the enhancing action on the benzimidazole, provided that the administration of each is performed within such period of time as will allow the beneficial interaction between the benzimidazole and substituted phenothiazine against the helminths. This period of time will vary between different species of animal and from compound to compound. However, administration of one compound within as much as six hours of the other may be performed. If this mode of operation is practiced, the period is preferably not more than one hour.

According to another aspect of the invention, the substituted phenothiazines themselves have been found to be effective as anthelmintic agents. They may, therefore, be employed in any of the foregoing compositions without any 2-substituted benzimidazoles being present. Convenient dosage levels are from 10–300 mg./kg. of animal body weight and preferably from 20–200 mg./kg. of animal body weight. The remaining ingredients of the composition when the substituted phenothiazines are used alone may be the same as in the formulations, i.e., tablets, boluses, drenches, predrenches, feeds, feed premixes, and feed supplements, previously discussed in connection with compositions additionally containing 2-substituted benzimidazoles. The amount of substituted phenothiazine in the composition may be as much as, and more if desired, the combined weight of substituted phenothiazine plus 2-substituted benzimidazole in the 2-component formulation.

The preferred tricyclic compounds for use in this aspect of the invention are 10-(2-trimethylammonium)-propyl phenothiazine methyl sulfate and 2-propionyl-10-(3-dimethylaminopropyl)-phenothiazine.

The 2-substituted benzimidazoles wherein $R_1$ is hydroxy or alkoxy may be prepared by treating an o-nitroanilide of the formula

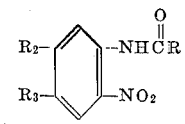

where R, $R_2$, and $R_3$ are as previously defined, in a hetergeneous solvent system containing water and an organic solvent immiscible in water to reduce the nitro group to the hydroxylamino group. Solvents such as benzene, toluene, and the like may be employed. The reducing agents particularly suitable for the conversion are water soluble metal hydrosulfides, for example, ammonium hydrosulfide or sodium or potassium hydrosulfides. The reduction is preferably carried out at temperatures from about 0° C. to about 25° C. As a result of this operation, the 2-substituted benzimidazoles wherein $R_1$ is hydroxy are obtained, ring closure being effected in the reducing step. Example 5 hereinafter shows a method which may be employed generally to produce said compounds.

The 2-substtituted benzimidazoles wherein $R_1$ is alkoxy are prepared from the foregoing 2-substituted benzimidazoles wherein $R_1$ is hydroxy by treating the hydroxy compound with a strong base and an alkylating agent such as a lower alkyl halide or a dilower alkyl sulfate, the alkyl group of the alkylating agent corresponding to the alkly moiety of the alkoxy group desired at $R_1$. Suitable bases are alkali metal hydroxides such as sodium and potassium hydroxide whereas suitable alkylating agents are methyl and ethyl iodide, dimethyl sulfate diethyl sulfate, and the like. The temperature of the reaction is preferably maintained at between 40 and 120° C. The alkoxy substituted benzimidazole may be isolated and purified by techniques well known in the art. Example 6 appearing hereinafteer is considered to be representative of methods for preparing the alkoxides.

The following examples are given for the purpose of illustration only and not by way of limitation.

EXAMPLE 1

Experimental infections of a phenothiazine resistant strain of the large stomach worm *Haemonchus contortus*, of sheep, are established in Haemonchus-free hosts. Three groups of separate drench suspensions are prepared using a 2% w./v.) methyl cellulose aqueous suspension vehicle. One group of drenches is made up of separate drenches each containing one of the substituted phenothiazines listed in Table I alone. Another group is comprised of individual drenches containing one of the compounds of Table I together with 2-(4'-thiazolyl)benzimidazole. Drenches containing 2-(4'-thiazolyl)benzimidazole alone are also prepared. Each drench is administered as a single oral dose to separate groups of hosts at a dosage level of (unless otherwise indicated) 100 mg. of each drug per kg. of animal body weight. At the time of treatment, the infection is ten days old. Worms remaining after treatment are determined at necropsy two days after dosing. Efficacy is determined as percent reduction in number of *Haemonchus contortus* in treated animals compared to the number harbored by untreated infected control animals. The percent reduction in worms is calculated from the formula $$\frac{Hc-Ht}{Hc} \times 100 = \text{percent reduction}$$

where $Hc$ is the average number of Haemonchus in untreated infected control animals and $Ht$ is the average number of Haemonchus in the treated group. The efficacy of the formulations containing both the substituted phenothiazine and the 2-(4'-thiazolyl)benzimidazole is compared in Table I to the expected efficacy expressed as the sum of the activities of each compound when administered alone.

TABLE I

| Substituted phenothiazine | Efficacy, percent reduction | |
|---|---|---|
| | Expected efficacy [1], percent | Actual efficacy from composition, percent |
| 2-chloro-10-(3-dimethyl-aminopropyl)-phenothiazine | 15 | 77 |
| 2-chloro-10-[3-(1-(2-hydroxyethyl)-4-piperazinyl)-propyl]-phenothiazine | 38 | 61 |
| 10-(2-diethylamino-1-propyl-phenothiazine | 38 | 67 |
| 2-chlorophenothiazine [2] | 15 | 30 |

[1] The sum of percent reductions for the substituted phenothiazine and the 2-(4'-thiazolyl)benzimidazole when administered individually.
[2] Dosage level 300 mg./kg. of animal body weight when used alone and in combination with 2-(4'-thiazolyl)benzimidazole.

As can be seen from the foregoing table, the actual efficacy of the compositions containing both the substituted phenothiazine and the benzimidazole far exceed what is to be expected from the sum of individual activities.

EXAMPLE 1-A

Experimental infections of a phenothiazine-resistant strain of the large stomach worm of sheep, *Haemonchus contortus*, were established in Haemonchus-free hosts. Drench suspensions of test compounds were prepared by grinding the compounds in 2% (w./v.) aqueous methyl cellulose. The drenches were administered as a single oral dose at the dosage levels indicated. At the time of treatment the infection was ten days old. The worms remaining in the stomach after treatment were determined at necropsy two days after dosing. Efficacy was determined as percent reduction in a number of *Haemonchus contortus* in treated animals compared to the number harbored by untreated infected control animals. The percent reduction in worms was calculated from the formula $$\frac{Hc-Ht}{Hc} \times 100 = \text{percent reduction}$$

where $Hc$ was the average number of Haemonchus in untreated infected control animals and $Ht$ was the average number of Haemonchus in the respective treated groups. The results of the tests are shown in following Table I-A.

TABLE I-A

| Treatment | Dosage, mg./kg. | Percent reduction |
|---|---|---|
| 2-(4'-thiazolyl)benzimidazole | 300 | 66 |
| Do | 200 | 46 |
| Do | 100 | 16 |
| Phenothiazine | 300 | 6 |
| Phenothiazine + 2-(4'-thiazolyl)benzimidazole | 300+100 | 25 |
| 2-chloro-10-(3-dimethylaminopropyl)-phenothiazine | 100 | 0 |
| 2-chloro-10-(3-dimethylaminopropyl)-phenothiazine + 2-(4'-thiazolyl)benzimidazole | 100+100 | 77 |
| 2-chloro-10-3-[1-(2-hydroxyethyl)-4-piperazinyl]-propyl phenothiazine | 100 | 7 |
| 2-chloro-10-3-[1-(2-hydroxyethyl)-4-piperazinyl]-propyl phenothiazine + 2-(4'-thiazolyl)benzimidazole | 100+100 | 57 |
| 10-(2-dimethylaminopropyl)phenothiazine | 100 | 0 |
| 10-(2-dimethylaminopropyl)phenothiazine + 2-4'-(thiazolyl)benzimidazole | 100+100 | 64 |
| 2-chlorophenothiazine | 300 | 0 |
| 2-chlorophenothiazine + 2-(4'-thiazolyl)benzimidazole | 300+100 | 32 |

In the above test for synergistic action the dosages of the phenothiazine compounds were chosen at levels where these compounds are minimally effective. However, it should be noted that the 2-substituted phenothiazines are active at the proper dosage levels.

The data from these experiments were further examined to determine the $ED_{50}$ (mg./kg.) and the potency ratio of the compositions tested. The potency ratio was determined by straight-line bioassay methods from a linear dose response curve using log (dose) and probit (percent) transformations wherein 2-(4'-thiazolyl)benzimidazole is the standard with a potency of 1.00. The results of these evaluations are listed below in Table II-A.

TABLE II-A

| Treatment | $ED_{50}$, mg./kg. | Potency ratio |
|---|---|---|
| 2-(4'-thiazolyl)benzimidazole | 261 | 1.00 |
| 2-(4'-thiazolyl)benzimidazole (1 part) + phenothiazine (3 parts) | 167+500 | 1.30 |
| 2-(4'-thiazolyl)benzimidazole (1 part) + 2-chlorophenothiazine (3 parts) | 140+420 | 1.51 |
| 2-(4'-thiazolyl)benzimidazole + 2-chloro-10-3-[1-(2-hydroxyethyl)-4-piperazinyl]-propyl-phenothiazine (1 part) | 86+86 | 2.50 |
| 2-(4'-thiazolyl)benzimidazole (1 part) + 10-(2-dimethylaminopropyl)-phenothiazine | 75+75 | 2.90 |
| 2-(4'-thiazolyl)benzimidazole (1 part) + 2-chloro-10-(3-dimethyl-aminopropyl)phenothiazine (1 part) | 56+56 | 3.89 |

As can be seen from the foregoing tables, the actual efficacy of the compositions containing both the substituted phenothiazine and the benzimidazole far exceed what is to be expected from the sum of individual activities.

EXAMPLE 1-B

Experimental infections of a phenothiazine resistant strain of the large stomach worm *Haemonchus contortus*, of sheep were established in Haemonchus-free hosts. Three groups of separate drench suspensions were prepared using a 2% (w./v.) methyl cellulose aqueous suspension vehicle. One group of drenches was made up of separate drenches each containing one of the phenothiazines listed in Table I-B alone. Another group was comprised of individual drenches containing the compositions listed in Table I-B.

Drenches containing the various benzimidazoles alone were also prepared. Each drench was administered as a single oral dose to separate groups of hosts at the indicated dosage level. At the time of treatment, the infection was eight days old and in a stage of development generally considered to be least responsive to chemotherapy. Worms remaining after treatment were determined at necropsy two days after dosing. Efficacy was determined as percent reduction in number of *Haemonchus contortus* in treated animals compared to the number harbored by untreated infected control animals. The percent reduction in worms was calculated from the formula $$\frac{Hc-Ht}{Hc} \times 100 = \text{percent reduction}$$

where Hc is the average number of Haemonchus in untreated infected control animals and Ht is the average number of Haemonchus in the treated group. The efficacy of the formulations containing both phenothiazine and the benzimidazole is compared in Table I-B to the expected efficacy expressed as the sum of the activities of each compound when administered alone at the same dosage level as is employed in the composition.

The abbreviations used hereinbelow have the following significance:

CPI: 2-chloro-10-(3-dimethylaminopropyl)phenothiazine
PPI: 2-chloro-10-(3-[4-(2-hydroxyethyl)piperazinyl]propyl)phenothiazine
PCPE: 2-chloro-10-[3-(1-methyl-4-piperazinyl)-propyl]phenothiazine
MDI: 10-(1-methyl-3-pyrrolidylmethyl)phenothiazine
TBZ: 2-(4'-thiazolyl)benzimidazole
BZA: benzimidazole
PMI: 10-(2-dimethylaminopropyl)phenothiazine

TABLE I-B

| Benzimidazole | Phenothiazine | Dosage mg./kg. Benzimidazole | Dosage mg./kg. Phenothiazine | Efficacy percent reduction from composition Control[1] | Efficacy percent reduction from composition Actual |
|---|---|---|---|---|---|
|  | CPI |  | 50 |  | 8 |
|  | CPI |  | 15 |  | 6 |
|  | CPI |  | 30 |  | 11 |
|  | PPI |  | 50 |  | 0 |
|  | MDI |  | 50 |  | 5 |
|  | PMI |  | 50 |  | 10 |
|  | PCPE |  | 50 |  | 4 |
| N-methyl, TBZ |  | 300 |  |  | 17 |
| N-methoxy, TBZ |  | 300 |  |  | 33 |
| 5-phenyl, TBZ |  | 100 |  |  | 2 |
| 2-(2'-furyl), BZA |  | 100 |  |  | 9 |
| 5,6-difluoro, TBZ |  | 100 |  |  | 23 |
| 2-(3'-thia-1'-coumarinyl), BZA |  | 100 |  |  | 5 |
| 2-(2'-naphthyl), BZA |  | 100 |  |  | 2 |
| 2-(1'-pyrazolyl), BZA |  | 100 |  |  | 0 |
| 2-(2'-furyl)-5 (or 6) phenyl, BZA |  | 100 |  |  | 0 |
| 2-(3'-fluoro-2'-naphthyl), BZA |  | 100 |  |  | 8 |
| N-methyl, TBZ plus | CPI | 300 | 15 | 23 | 60 |
| Do | CPI | 300 | 30 | 28 | 77 |
| Do | CPI | 300 | 50 | 35 | 77 |
| Do | CPI | 100 | 50 | 8 | 50 |
| N-methoxy, TBZ | CPI | 100 | 50 | 13 | 62 |
| 5,6-difluoro, TBZ | CPI | 100 | 50 | 31 | 36 |

See footnote at end of table.

TABLE I-B—Continued

| Benzimidazole | Phenothiazine | Dosage mg./kg. Benzimidazole | Dosage mg./kg. Phenothiazine | Efficacy, percent reduction from composition Control[1] | Efficacy, percent reduction from composition Actual |
|---|---|---|---|---|---|
| 2-(3'-thia-1'-coumarinyl), BZA | CPI | 100 | 50 | 13 | 30 |
| 2-(2'-naphthyl), BZA | CPI | 100 | 50 | 10 | 78 |
| 2-(1'-pyrazolyl), BZA | CPI | 100 | 50 | 8 | 46 |
| 2-(2'-furyl)-5 (or 6) phenyl, BZA | CPI | 100 | 50 | 8 | 60 |
| 2-(2'-furyl), BZA | CPI | 100 | 50 | 8 | 60 |
| 5-phenyl, TBZ | CPI | 100 | 50 | 43 | 84 |
| 2-(3'-fluoro-2'-naphthyl), BZA | CPI | 100 | 50 | 16 | 68 |
| N-methyl, TBZ | PPI | 300 | 50 | 17 | 67 |
| Do | MDI | 300 | 50 | 22 | 64 |
| 5-phenyl, TBZ | PMI | 100 | 50 | 12 | 36 |
| 2-(2'-furyl), BZA | PCPE | 100 | 50 | 13 | 30 |
| N-methoxy, TBZ | PCPE | 300 | 50 | 37 | 70 |

[1] The control efficacy is the sum of the efficacies of the benzimidazole and the phenothiazine when administered separately.

EXAMPLE 2

Following the general procedure of Example 1, the indicated substituted phenothiazines are tested for their anthelmintic activity at a dosage level of 100 mg./kg. of animal body weight. The results are expressed below in Table III wherein a comparison is made between the efficacy of the substituted phenothiazine against that of phenothiazine employed alone as a standard at dosage levels of 600 and 1200 mg./kg.

TABLE III

| Compound: | Percent reduction |
|---|---|
| Phenothiazine at 600 mg./kg. | 0 |
| Phenothiazine at 1200 mg./kg. | 10 |
| 10-(2-trimethylammoniumpropyl) - phenothiazine methyl sulfate phenothiazine | 43 |
| 2 - propionyl - 10 - (3 - dimethylaminopropyl)-phenothiazine | 22 |

The following examples show the preparation of typical formulations containing the benzimidazole and substituted phenothiazine for administering to animals.

EXAMPLE 3

A drench is prepared by suspending the following ingredients in one quart of water. The ingredients may be blended into a dry mix first and the entire mix added to the water or they may be individually added to the water.

| | G. |
|---|---|
| 2-(4'-thiazolyl)benzimidazole | 25.0 |
| 2 - chloro - 10 - (3 - dimethylaminopropyl)-phenothiazine | 25.0 |
| Polysorbate 80 polyoxyethylene (20) sorbitan monooleate (Tween 80; available from Atlas Chem. Co.) | 0.13 |
| Sorbitan monolaurate (Span 20; available from Atlas Chem. Co.) | 0.13 |
| Antifoam AF (emulsion of dimethylpolysiloxane; available from Dow-Corning) | 0.06 |
| Pregelatinized starch | 40.7 |
| | 91.02 |

The total volume of the drench obtained after one quart of water is added is about 33 fluid ounces, each fluid ounce containing about 0.759 g. of 2-(4'-thiazolyl)benzimidazole and about 0.759 g. of 2-chloro-10-(3-dimethylaminopropyl)-phenothiazine.

EXAMPLE 4

A bolus containing 2-phenyl benzimidazole and 2-chlorophenothiazine suitable for oral administration to domesticated animals of about 50 pounds of body weight is prepared from the following ingredients:

| | G. |
|---|---|
| 2-phenyl benzimidazole | 3.3 |
| 2-chlorophenothiazine | 1.5 |
| Dicalcium phosphate | 3.0 |
| Starch | 0.535 |
| Guar gum | 0.15 |
| Talc | 0.14 |
| Magnesium stearate | 0.04 |
| | 8.665 |

The dicalcium phosphate is thoroughly mixed with the 2-phenyl benzimidazole and the 2-chlorophenothiazine and the mixture reduced to a particle size finer than 60 mesh. To the mixture is added 0.330 g. of starch in the form of an aqueous starch paste and the resulting mixture granulated in the usual manner. The granules are then passed through a No. 10 mesh screen and dried at 110°–130° F. for about 18 hours, and the dried material then passed through a No. 16 mesh screen. The guar gum and the balance of the starch are added and the mixture thoroughly blended. The remainder of the ingredients are then added and the whole thoroughly mixed and compressed.

EXAMPLE 5

2-(4'-thiazolyl)benzimidazole-1-oxide

To a solution of 24.92 g. of N-(o-nitrophenyl)-thiazole-4-carboxamide in 350 ml. methylene chloride is added 27.6 g. of sodium hydrosulfide dihydrate in 200 ml. of water over two hours at 5° C. Calcium chloride (10.0 g.) in 20 ml. of water is then added and the mixture is stirred vigorously in 5° C. for six hours and at room temperature for 18 hours. After addition of 10 g. of ammonium chloride and one hour of stirring, the solid is filtered and washed with water. It is then dissolved in 200 ml. water by addition of 10% hydrochloric acid until pH 1.2 is achieved. Insoluble impurities are filtered off and the pH of the clear filtrate is adjusted to pH 7 by addition of 6 N ammonium hydroxide. The precipitate is filtered, washed with water and dried in vacuo. Substantially pure 2-(4'-thiazolyl)benzimidazole-1-oxide is obtained by recrystallization of the crude material from ethanol; M.P. 237–238° C.

EXAMPLE 6

1-methoxy-2-(4'-thiazoyl)benzimidazole 2-(4'-thiazolyl)benzimidazole-1-oxide (0.651 g.) is added to a solution of 0.12 g. of sodium hydroxide in 6 ml. of methanol. To the clear solution is added 0.465 g. of methyliodide and the mixture is heated at 55°–60° C. for five hours. The solvent is removed in vacuo. The oily residue is diluted with 5 ml. of water and solidifies on standing. 1-methoxy-2(4'-thiazolyl)benzimidazole is separated by filtration, washed with water and recrystallized from (1:1) methanol-water; M.P. 117–118° C.

What is claimed is:

1. The method for treating helminthiasis which comprises administering orally to a helminth infected animal 100 mg./kg. of 2-(4'-thiazolyl)benzimidazole and 100 mg./kg. of 2-chloro-10-(3-dimethylaminopropyl)phenothiazine, said administering taking place within such time as will allow a beneficial interaction between the benzimidazole and the phenothiazine upon the animal.

2. The method for treating helminthiasis which comprises administering orally to a helminth infected animal 100 mg./kg. of 2-(4'-thiazolyl)benzimidazole and 100 mg./kg. of 2-chloro-10-[3-(1-(2-hydroxyethyl)-4-piperazinyl)propyl]phenothiazine, said administering taking place within such time as will allow a beneficial interaction between the benzimidazole and the phenothiazine upon the animal.

3. The method for treating helminthiasis which comprises administering orally to a helminth infected animal 100 mg./kg. of 2-(4'-thiazoyl)benzimidazole and 100 mg./kg. of 10-(2-dimethylaminopropyl)phenothiazine, said administering taking place within such time as will allow a beneficial interaction between the benzimidazole and the phenothiazine upon the animal.

4. The method for treating helminthiasis which comprises administering orally to a helminth infected animal 100 mg./kg. of 2-(4'-thiazolyl)benzimidazole and 300 mg./kg. of 2-chlorophenothiazine, said administering taking place within such time as will allow a beneficial interaction between the benzimidazole and the phenothiazine upon the animal.

5. The method for treating helminthiasis which comprises administering orally to a helminth infected animal from 100 to 300 mg./kg. of 1-methyl-2-(4'-thiazoyl)benzimidazole and from 50 to 15 mg./kg. of 2-chloro-10-(3- -dimethylaminopropyl)phenothiazine said administering taking place within such time as will allow a beneficial interaction between the benzimidazole and the phenothiazine upon the animal.

6. The method for treating helminthiasis which comprises administering orally to a helminth infected animal 300 mg./kg. of 1-methyl-2-(4'-thiazolyl)benzimidazole and 50 mg./kg. of 2-chloro-10-[3-(1-(2-hydroxyethyl)-4-piperazinyl)propyl]phenothiazine, said administering taking place within such time as will allow a beneficial interaction between the benzimidazole and the phenothiazine upon the animal.

7. The method for treating helminthiasis which comprises administering orally to a helminth infected animal 300 mg./kg. of 1-methyl-2-(4'-thiazolyl)benzimidazole and 50 mg./kg. of 10-(1-methyl-3-pyrrolidylmethyl)phenothiazine, said administering taking place within such time as will allow a beneficial interaction betwen the benzimidazole and the phenothiazine upon the aniimal.

8. The method for treating helminthiasis which comprises administering orally to a helminth infected animal 100 mg./kg. of 1-methoxy-2-(4'-thiazolyl)benzimidazole and 50 mg./kg. of 2-chloro-10-(3-dimethylaminopropyl)phenothiazine, said administering taking place within such time as will allow a beneficial interaction between the benzimidazole and the phenothiazine upon the animal.

9. The method for treating helminthiasis which comprises administering orally to a helminth infected animal 300 mg./kg. of 1-methoxy-2-(4'-thiazolyl)benzimidazole and 50 mg./kg. of 2-chloro-10-[3-(1-methyl-4-piperazinyl)propyl]phenothiazine, said administering taking place within such time as will allow a beneficial interaction between the benzimidazole and the phenothiazine upon the animal.

10. The method for treating helminthiasis which comprises administering orally to a helminth infected animal 100 mg./kg. of 5-phenyl-2-(4'-thiazolyl)-benzimidazole and 50 mg./kg. of 10-(2-dimethylaminopropyl)phenothiazine, said administering taking place within such time as will allow a beneficial interaction between the benzimidazole and the phenothiazine upon the animal.

11. An anthelmintic composition comprising 100 mg. of 2-(4'-thiazolyl)benzimidazole and 100 mg. of 2-chloro-10-(3-dimethylaminopropyl)-phenothiazine.

12. An anthelmintic composition comprising 100 mg. of 2-(4'-thiazolyl)benzimidazole and 100 mg. of 2-chloro-10-[3-(1-(2 - hydroxyethyl)-4-piperazinyl)propyl]phenothiazine.

13. An anthelmintic composition comprising 100 mg. of 2-(4'-thiazolyl)-benzimidazole and 100 mg. of 10-(2-dimethylaminopropyl)phenothiazine.

14. An anthelmintic composition comprising 100 mg. of 2-(4'-thiazolyl)benzimidazole and 300 mg. of 2-chlorophenothiazine.

15. An anthelmintic composition comprising from 100 to 300 mg. of 1-methyl-2-(4'-thiazolyl)benzimidazole and from 50 to 15 mg. of 2-chloro-10-(3-dimethylaminopropyl)phenothiazine.

16. An anthelmintic composition comprising 300 mg. of 1-methyl-2-(4'-thiazolyl)-benzimidazole and 50 mg. of 2-chloro-10-[3(1-(2-hydroxyethyl) - 4 - piperazinyl)-propyl]-phenothiazine.

17. An anthelmintic composition comprising 300 mg. of 1-methyl-2-(4'-thiazolyl)benzimidazole and 50 mg. of 10-(1-methyl-3-pyrrolidylmethyl)phenothiazine.

18. An anthelmintic composition comprising 100 mg. of 1-methoxy-2-(4'-thiazolyl)-benzimidazole and 50 mg. of 2-chloro-10-(3-dimethylaminopropyl)phenothiazine.

19. An anthelmintic composition comprising 300 mg. of 1-methoxy-2-(4'-thiazolyl)benzimidazole and 50 mg. of 2-chloro-10-[3-(1-methyl - 4 - piperazinyl)propyl]-phenothiazine.

20. An anthelmintic composition comprising 100 mg. of 5-phenyl-2-(4'-thiazolyl)benzimidazole and 50 mg. of 10-(2-dimethylaminopropyl)phenothiazine.

References Cited

UNITED STATES PATENTS

| | | | |
|---|---|---|---|
| 2,928,767 | 3/1960 | Gulesich | 424—174 |
| 3,162,574 | 12/1964 | Forsyth | 424—247 |

OTHER REFERENCES

Craig, Journ. Med. and Phar. Chem., vol. 2, No. 2, pp. 659–662 (1960).

STANLEY J. FRIEDMAN, Primary Examiner

U.S. Cl. X.R.

424—250, 271, 273, 281, 285